US012690080B2

(12) United States Patent
Kim et al.

(10) Patent No.: US 12,690,080 B2
(45) Date of Patent: Jul. 21, 2026

(54) METHOD AND DEVICE FOR REQUESTING AND RECEIVING INFORMATION ABOUT OTHER AP CORRESPONDING TO NONTRANSMITTED BSSID SET IN WIRELESS LAN SYSTEM

(71) Applicant: LG ELECTRONICS INC., Seoul (KR)

(72) Inventors: Namyeong Kim, Seoul (KR); Insun Jang, Seoul (KR); Jinsoo Choi, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 18/554,577

(22) PCT Filed: Apr. 28, 2022

(86) PCT No.: PCT/KR2022/006067
§ 371 (c)(1),
(2) Date: Oct. 9, 2023

(87) PCT Pub. No.: WO2022/255646
PCT Pub. Date: Dec. 8, 2022

(65) Prior Publication Data
US 2024/0205996 A1    Jun. 20, 2024

(30) Foreign Application Priority Data

May 31, 2021    (KR) ........................ 10-2021-0069984

(51) Int. Cl.
*H04W 4/00*        (2018.01)
*H04W 48/14*       (2009.01)
(Continued)

(52) U.S. Cl.
CPC ........... *H04W 76/15* (2018.02); *H04W 48/14* (2013.01); *H04W 76/11* (2018.02); *H04W 84/12* (2013.01)

(58) Field of Classification Search
USPC .......................................................... 370/338
See application file for complete search history.

(56) References Cited

U.S. PATENT DOCUMENTS 12,034,540 B2 *   7/2024   Gan ....................... H04W 76/15
2022/0264429 A1 *  8/2022   Gan .................... H04W 52/028
(Continued)

FOREIGN PATENT DOCUMENTS

KR    10-2009-0132650    12/2009
KR    10-2014-0090001    7/2014
(Continued)

OTHER PUBLICATIONS

PCT International Application No. PCT/KR2022/006067, International Search Report dated Aug. 1, 2022, 3 pages.
(Continued)

*Primary Examiner* — Chuong T Ho
(74) *Attorney, Agent, or Firm* — LEE, HONG, DEGERMAN, KANG & WAIMEY

(57)            ABSTRACT

Presented are a method and a device for requesting and receiving information about other AP corresponding to a nontransmitted BSSID set in a wireless LAN system. Particularly, a reception MLD transmits a multi-link (ML) probe request frame from a transmission MLD through a first link. The reception MLD receives an ML probe response frame from the transmission MLD through the first link. The transmission MLD includes first and second transmission MLDs. The first transmission MLD includes a first transmission STA operating in the first link. The second transmission MLD includes a second transmission STA
(Continued)

operating in the first link, and a third transmission STA operating in a second link. The second transmission STA is a transmission STA corresponding to a first nontransmitted BSSID of a set of multiple BSSIDs on the basis of the first transmission STA.

11 Claims, 19 Drawing Sheets

(51) Int. Cl.
  *H04W 76/11* (2018.01)
  *H04W 76/15* (2018.01)
  *H04W 84/12* (2009.01)

(56) References Cited

U.S. PATENT DOCUMENTS

| | | | |
|---|---|---|---|
| 2022/0386301 A1* | 12/2022 | Lu | H04W 48/16 |
| 2023/0024407 A1* | 1/2023 | Gan | H04W 48/08 |
| 2024/0236880 A1* | 7/2024 | Patil | H04W 56/0005 |

FOREIGN PATENT DOCUMENTS

| | | |
|---|---|---|
| KR | 10-2015-0013120 | 2/2015 |
| WO | 2021-011426 | 1/2021 |

OTHER PUBLICATIONS

Patil et al., "Resolution for CIDs related to MLO Discovery (CC 34)," IEEE 802.11-21/0650r4, May 2021, 11 pages.

\* cited by examiner (a)

Figure 4:
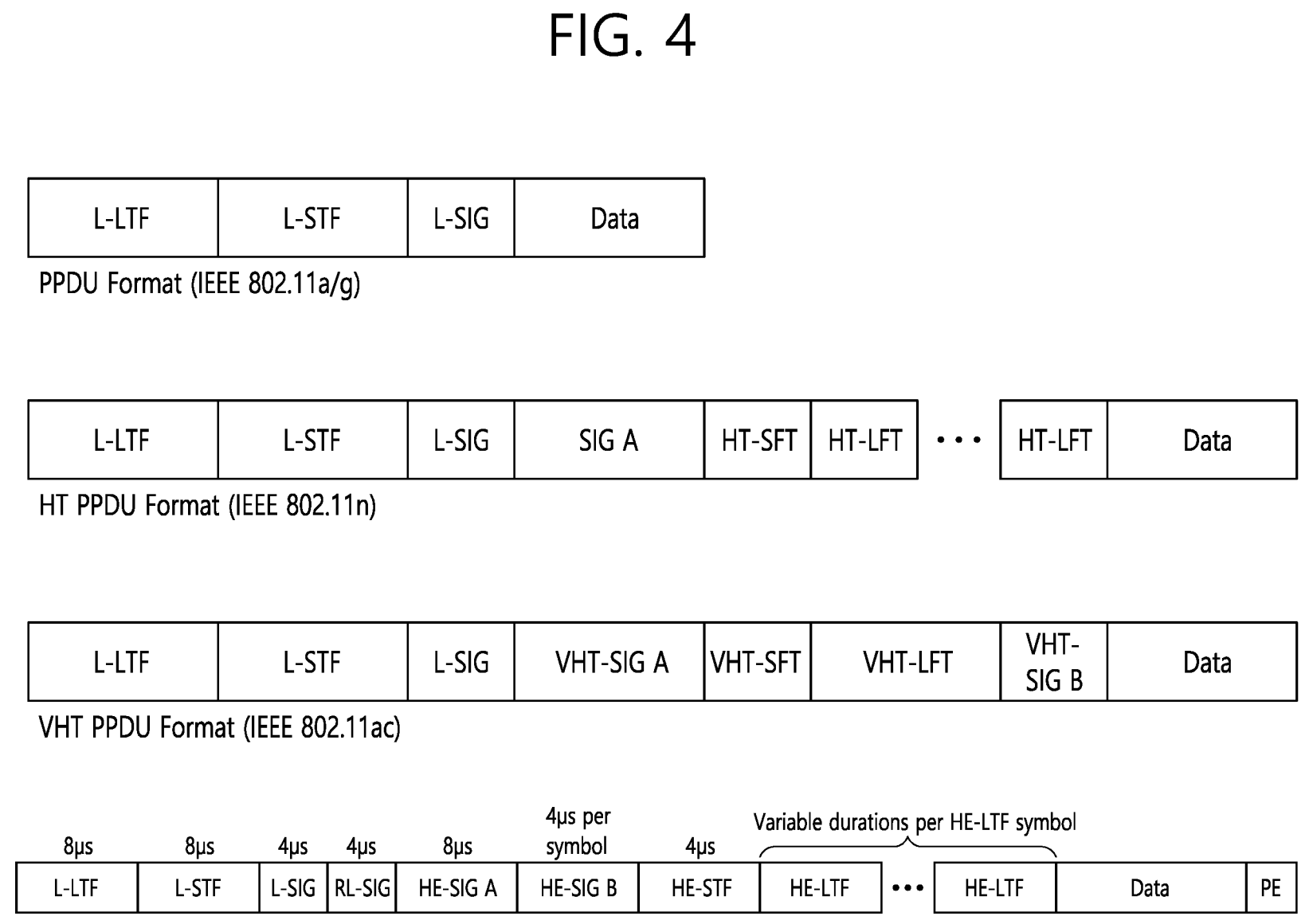

| L-LTF | L-STF | L-SIG | Data |
|-------|-------|-------|------|

PPDU Format (IEEE 802.11a/g)

| L-LTF | L-STF | L-SIG | SIG A | HT-SFT | HT-LFT | • • • | HT-LFT | Data |
|-------|-------|-------|-------|--------|--------|-------|--------|------|

HT PPDU Format (IEEE 802.11n)

| L-LTF | L-STF | L-SIG | VHT-SIG A | VHT-SFT | VHT-LFT | VHT-SIG B | Data |
|-------|-------|-------|-----------|---------|---------|-----------|------|

VHT PPDU Format (IEEE 802.11ac)

| 8μs | 8μs | 4μs | 4μs | 8μs | 4μs per symbol | 4μs | | Variable durations per HE-LTF symbol | | | |
|------|-------|-------|--------|---------|----------|--------|---------|----------|-------|------|-----|
| L-LTF | L-STF | L-SIG | RL-SIG | HE-SIG A | HE-SIG B | HE-STF | HE-LTF | • • • | HE-LTF | Data | PE |

| Length | cascade indication | CS required | HE-SIG-A info | CP and LTF type | Trigger Type |
|---|---|---|---|---|---|
| 12 | 1 | 1 | TBD | TBD | TBD |

Bits :

| L-STF | L-LTF | L-SIG | RL-SIG | U-SIG | EHT-SIG | EHT-STF | EHT-LTF | Data |
|-------|-------|-------|--------|-------|---------|---------|---------|------|

FIG. 12

| STA MLD | | |
|---------|--------|--------|
| STA 1 | STA 2 | STA 3 |

Link 1    Link 2    Link 3 receiving, by a transmitting multi-link device (MLD), a Multi-Link (ML) probe request frame from a receiving MLD through a first link — S1810 transmitting, by the transmitting MLD, an ML probe response frame to the receiving MLD through the first link — S1820 transmitting, by a receiving multi-link device (MLD), a Multi-Link (ML) probe request frame to a transmitting MLD through a first link    ~S1910 receiving, by the receiving MLD, an ML probe response frame from the transmitting MLD through the first link    ~S1920

METHOD AND DEVICE FOR REQUESTING AND RECEIVING INFORMATION ABOUT OTHER AP CORRESPONDING TO NONTRANSMITTED BSSID SET IN WIRELESS LAN SYSTEM

CROSS-REFERENCE TO RELATED APPLICATIONS

This application is the National Stage filing under 35 U.S.C. 371 of International Application No. PCT/KR2022/006067, filed on Apr. 28, 2022, which claims the benefit of earlier filing date and right of priority to Korean Application No. 10-2021-0069984, filed on May 31, 2021, the contents of which are all hereby incorporated by reference herein in their entireties.

TECHNICAL FIELD

The present specification relates a multi-link operation in a wireless local area network (WLAN) system and, most particularly, to a method and apparatus for requesting and receiving information on another AP corresponding to a nontransmitted BSSID set.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for requesting and receiving information on another AP corresponding to a nontransmitted BSSID set in a wireless LAN system.

An example of this specification proposes a method for requesting and receiving information on another AP corresponding to a nontransmitted BSSID set.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The present embodiment proposes a method and apparatus in which a non-AP STA requests information on another AP corresponding to a nontransmitted BSSID set through an ML probe request frame and receives the requested information through an ML probe response frame. Here, the first transmitting STA operating on the first link included in the first transmitting MLD may correspond to a reporting AP. A second transmitting STA operating on the first link included in the second transmitting MLD and a fourth transmitting STA operating on the first link included in the third transmitting MLD may correspond to an AP corresponding to the nontransmitted BSSID of a multiple BSSID set based on the reporting AP. A third transmitting STA operating on the second link included in the second transmitting MLD may correspond to another AP whose range of the other AP with a different link is extended to the nontransmitted BSSID.

A receiving Multi-link Device (MLD) transmits a Multi-Link (ML) probe request frame to a transmitting MLD through a first link.

The receiving MLD receives an ML probe response frame from the transmitting MLD through the first link.

The transmitting MLD includes first and second transmitting MLD. The first transmitting MLD includes a first transmitting station (STA) operating on the first link. The second transmitting MLD includes a second transmitting STA operating on the first link and a third transmitting STA operating on the second link.

The second transmitting STA is a transmitting STA corresponding to a first nontransmitted BSSID of a multiple Basic Service Set IDentifier (BSSID) set based on the first transmitting STA. When the first transmitting STA is a transmitting STA corresponding to a transmitted BSSID of the multiple BSSID set, the second transmitting STA may be a transmitting STA corresponding to a nontransmitted BSSID of the multi-BSSID set.

Transmitting STAs (APs) belonging to the same multiple BSSID set configured for a specific link do not belong to the same transmitting MLD (AP MLD). This embodiment shows an example in which the first transmitting STA included in the first transmitting MLD and the second transmitting STA included in the second transmitting MLD belong to the multiple BSSID set set in the first link.

The receiving MLD includes a first receiving STA operating on the first link and a second receiving STA operating on the second link. The first receiving STA may operate on the first link with the first transmitting STA of the first transmitting MLD.

The ML probe response frame includes a multiple BSSID element. The multiple BSSID element may indicate the multiple BSSID set with a specific ID value. For example, when the specific ID value is 71, the multiple BSSID element may be set as an element or field for the multiple BSSID set including the first and second transmitting STAs (or the fourth transmitting STA described later) operating in the first link.

The multiple BSSID element includes a profile of the first nontransmitted BSSID. The profile of the first nontransmitted BSSID may be set as a profile field for the second transmitting STA corresponding to the first nontransmitted BSSID of the multiple BSSID set.

The profile of the first nontransmitted BSSID includes a basic ML element. The basic ML element includes a profile subelement of the third transmitting STA. That is, the profile of the first nontransmitted BSSID may include a profile subelement of another AP (the third transmitting STA) operating on a link other than the link on which the non-AP STA operates.

When the first receiving STA requests updated BSS parameter information for the third transmitting STA (or partial information or information on a specific element for the third transmitting STA), the profile subelement of the third transmitting STA includes the updated BSS parameter information for the third transmitting STA (or partial information or information on a specific element for the third transmitting STA).

That is, this embodiment may extend the range of the other AP (the third transmitting STA) operating on a link other than the link (the second link) on which the non-AP STA (the first receiving STA) operates to the nontransmitted BSSID set, by including the multiple BSSID element in the ML probe response frame, by including the profile of the first nontransmitted BSSID in the multiple BSSID element, and by including the profile subelement of the third transmitting STA in the profile of the first nontransmitted BSSID.

According to the embodiment proposed in this specification, a non-AP STA can obtain information about APs corresponding to a nontransmitted BSSID through an ML probe request frame. In particular, the method of requesting partial information of other APs in AP MLD can be useful because it can reduce frame overhead compared to the method of requesting complete information. This method has the effect of expanding the range of these other APs to APs belonging to the nontransmitted BSSID set, allowing non-AP STAs to perform ML probing for a wider range of other APs.

BRIEF DESCRIPTION OF THE DRAWINGS

FIG. 4 illustrates an example of a PPDU used in an IEEE standard.

FIG. 10 illustrates an example of a PPDU used in the present specification.

FIG. 12 shows an example of a structure of a STA MLD.

DETAILED DESCRIPTION

Figure 1:
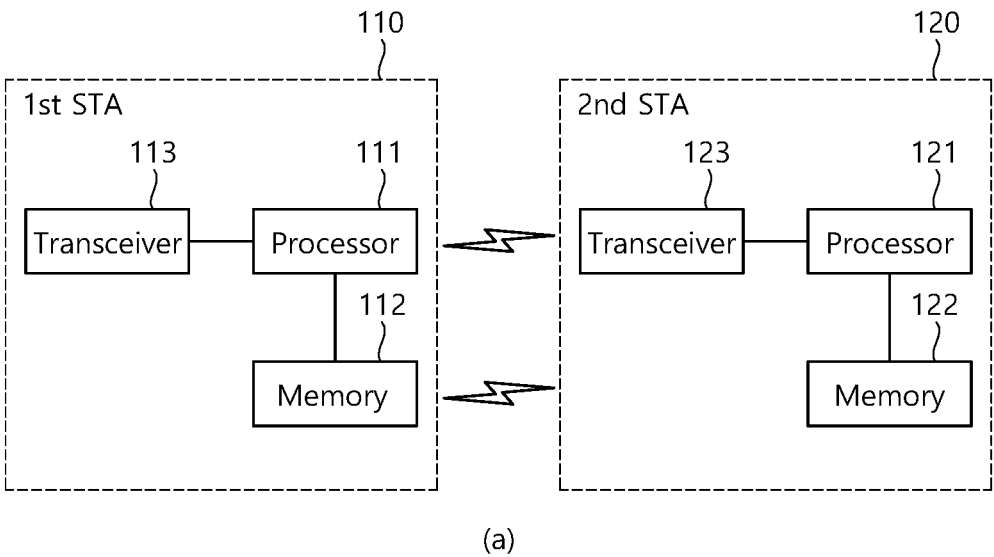
FIG. 1 shows an example of a transmitting apparatus and/or receiving apparatus of the present specification.
Figure 1:
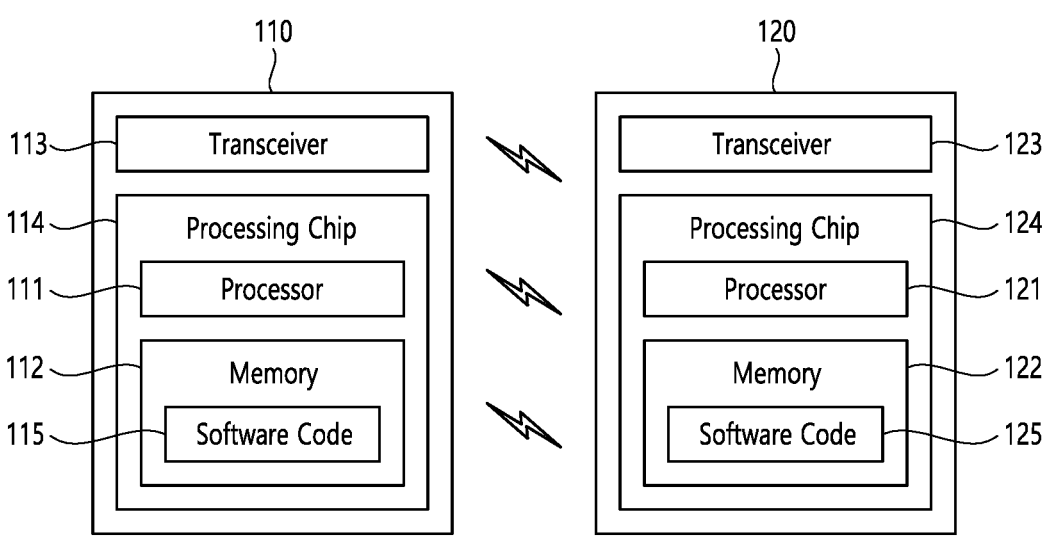

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU: 2) an operation of determining/configuring/obtaining a time resource or frequency resource (e.g., a subcarrier resource) or the like used for the sub-field (SIG. STF. LTF. Data) included the PPDU: 3) an operation of determining/configuring/obtaining a specific sequence (e.g., a pilot sequence, an STF/LTF sequence, an extra sequence applied to SIG) or the like used for the sub-field (SIG. STF. LTF. Data) field included in the PPDU: 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel R; or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
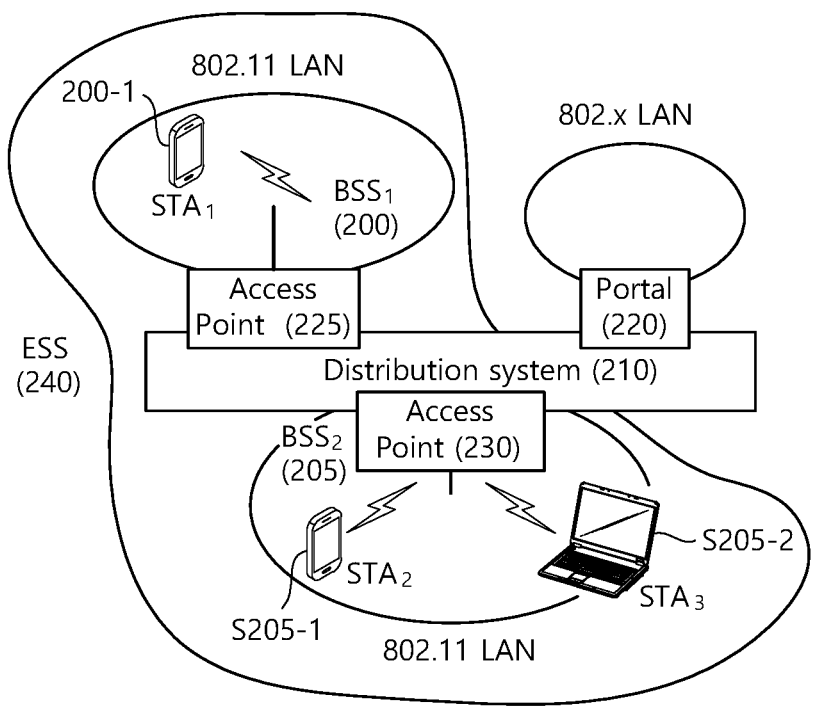
FIG. 2 is a conceptual view illustrating the structure of a wireless local area network (WLAN).
Figure 2:
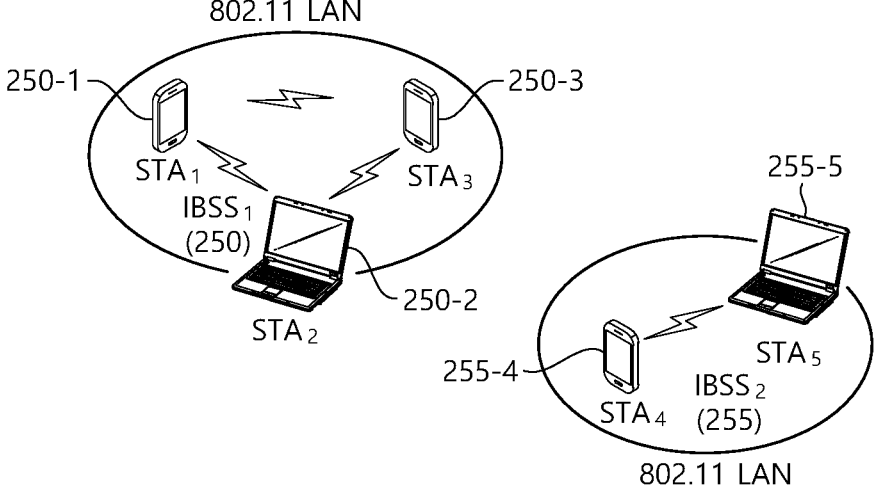

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230) and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
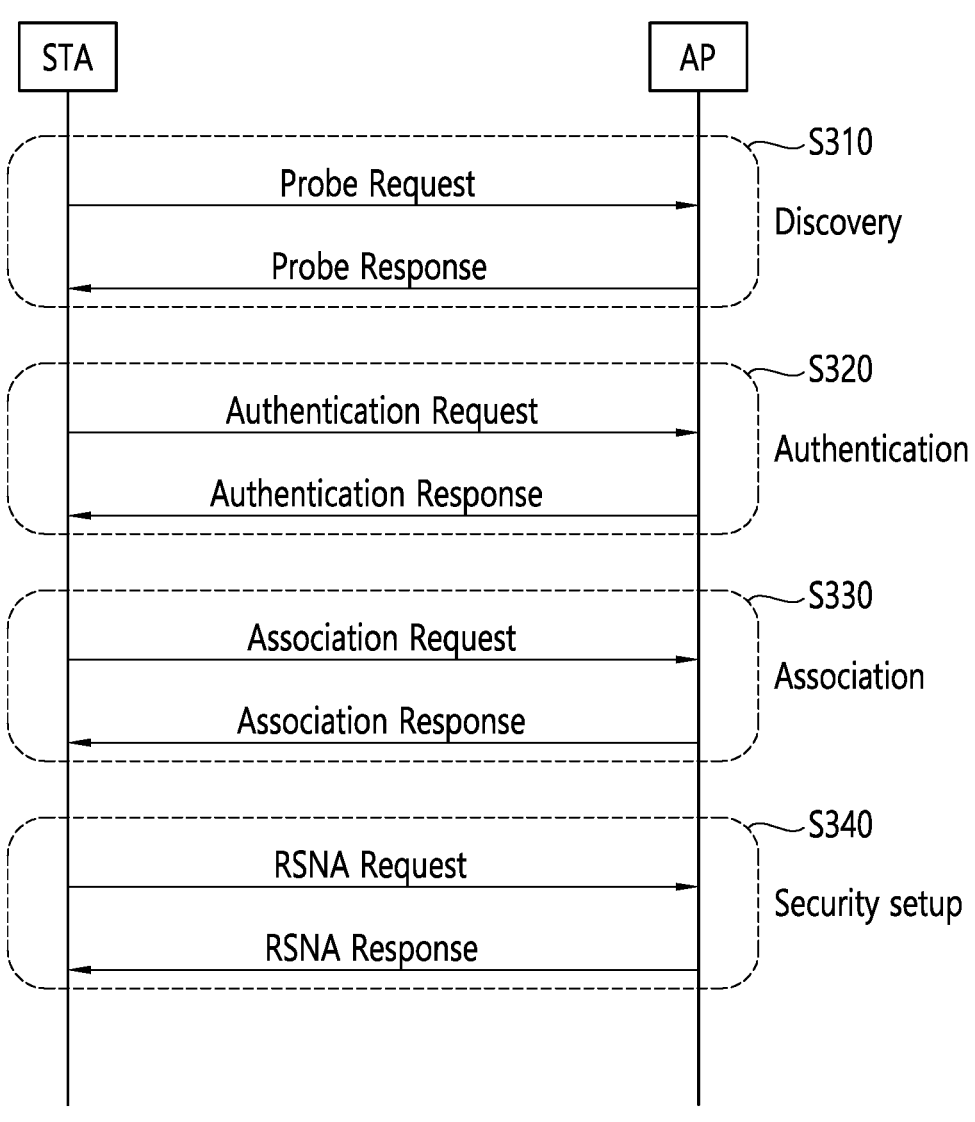
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS. STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
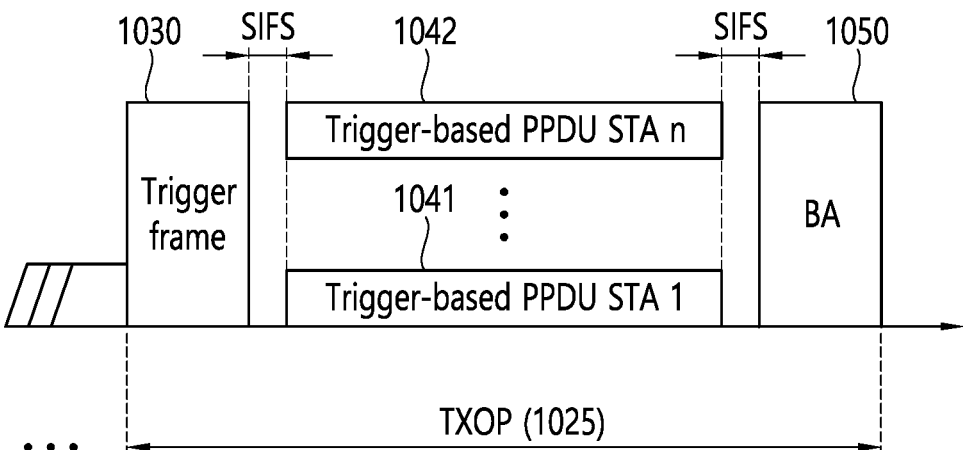
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
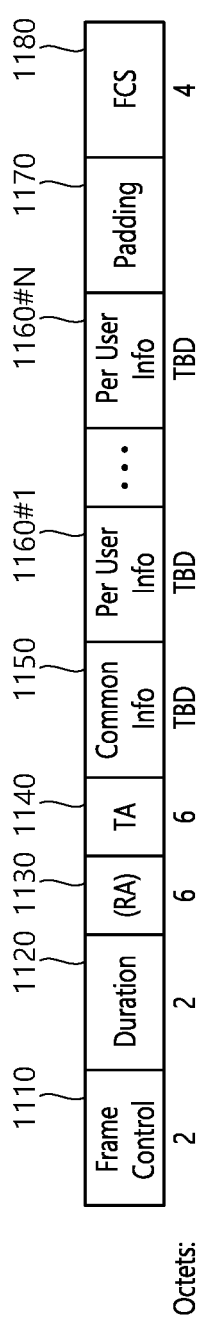
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
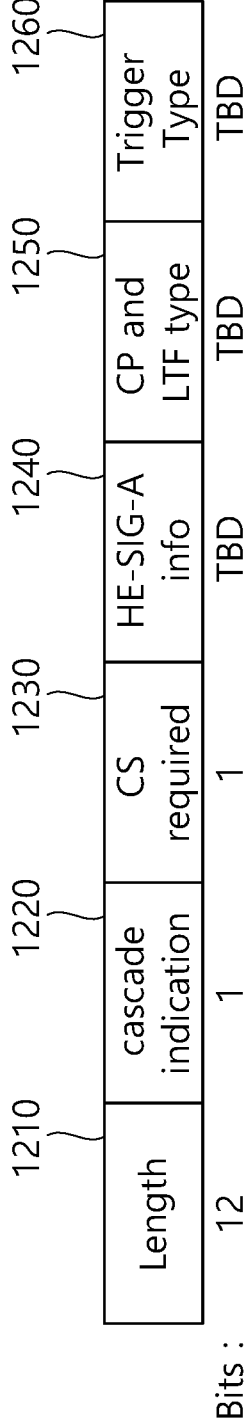
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
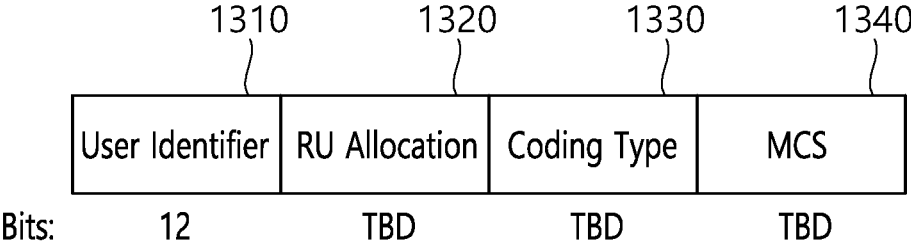
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to "0".

Hereinafter, a UL OFDMA-based random access (UORA) scheme will be described.

Figure 9:
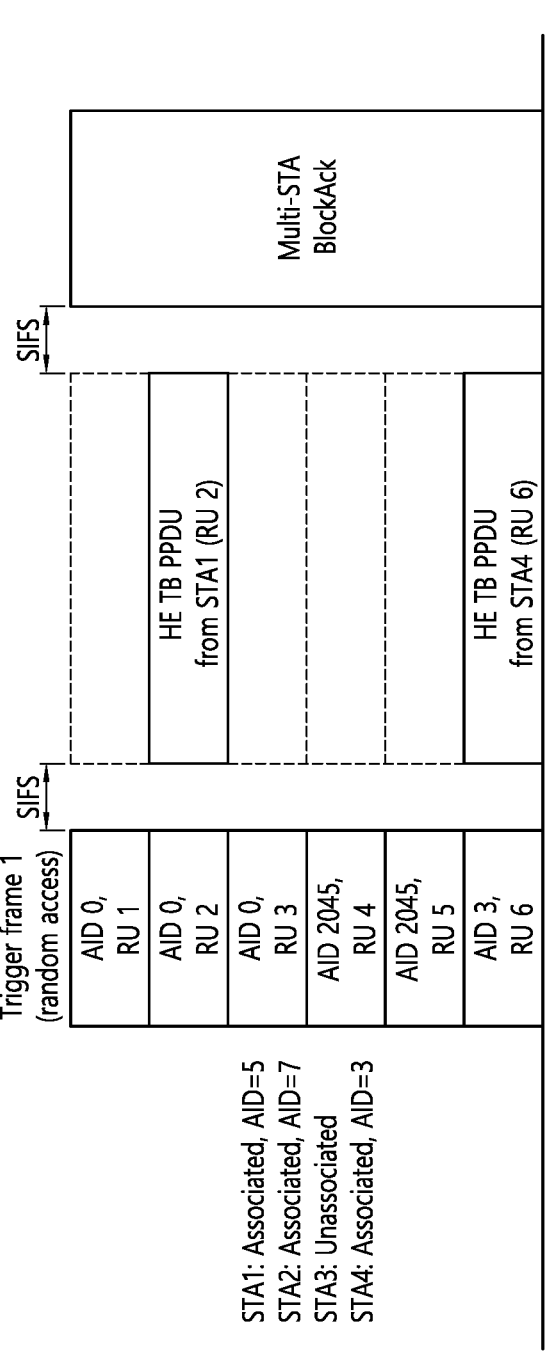
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0) may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0), and the STA1 randomly selects the 2nd RU resource (AID 0). RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1. RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4. RU 5), and thus the STA3 decreases the OBO counter by 2 but the OBO counter is greater than 0).

Hereinafter, a PPDU transmitted/received in a STA of the present specification will be described.

Figure 10:
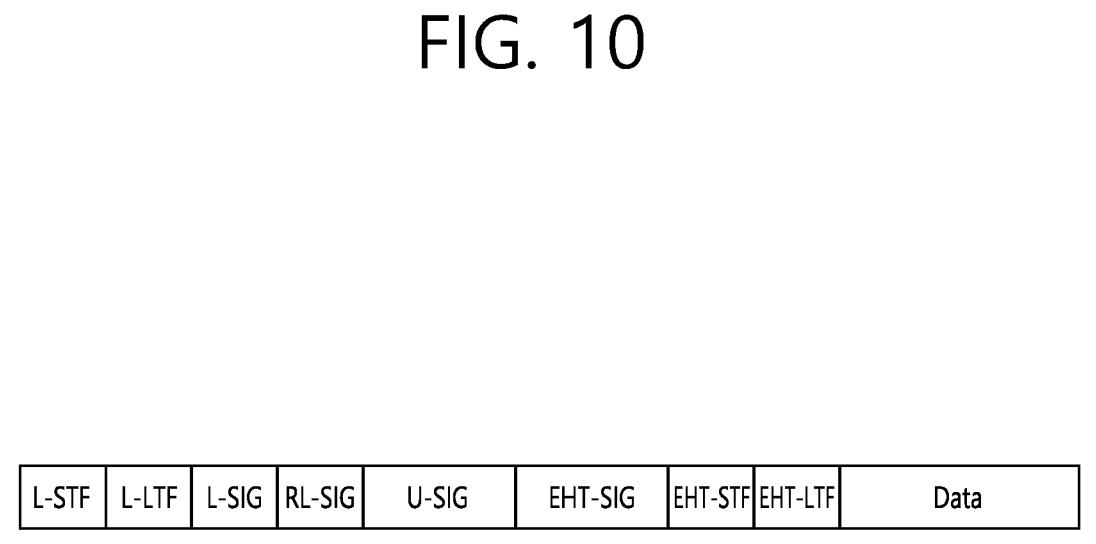

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz. and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0)}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0). The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth: 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
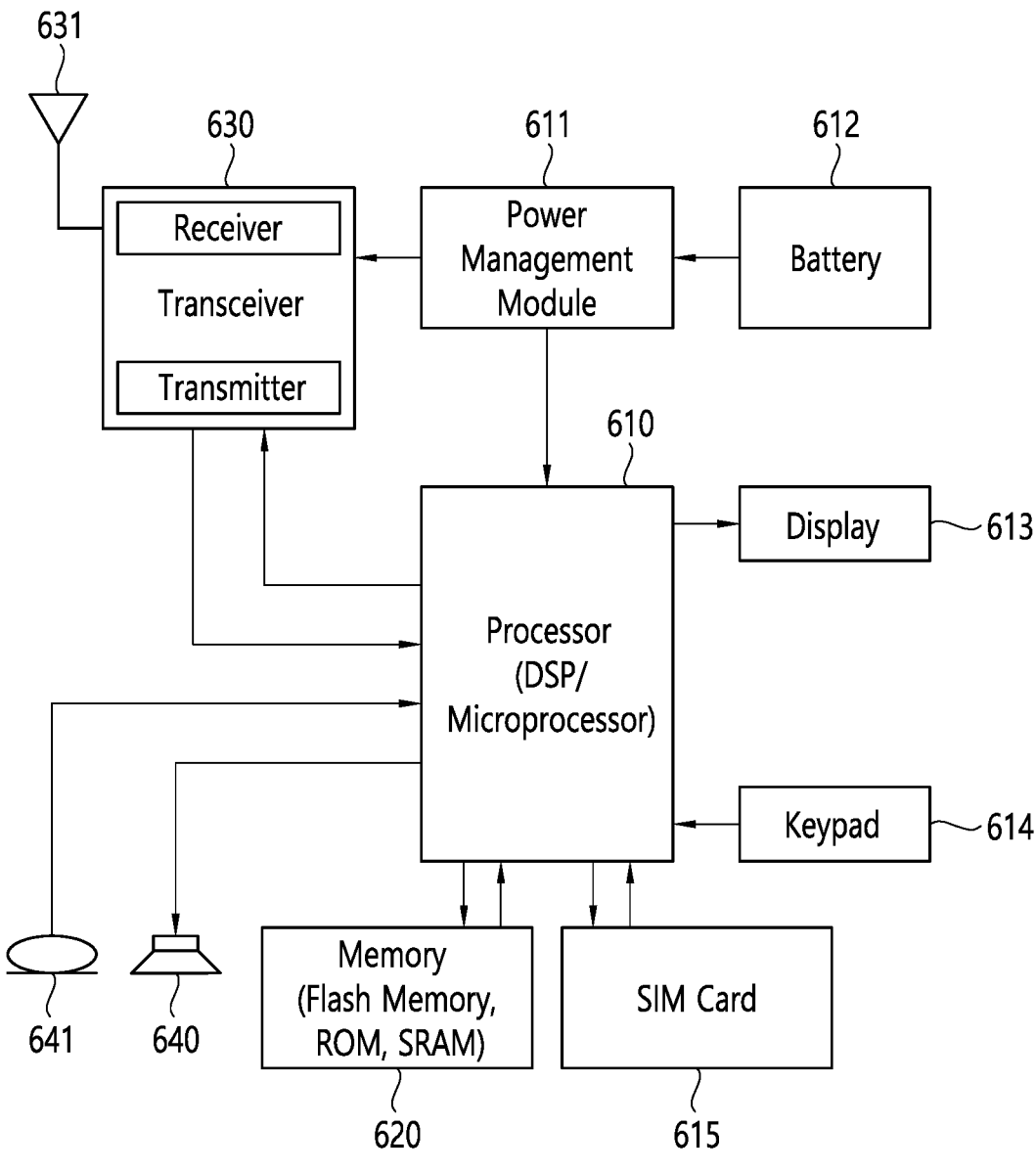
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHZ band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHZ/6 GHz band) and at least one channel within the 5 GHz band (or 2.4 GHz/6 GHZ band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHZ, 5 GHZ, 6 GHZ, 60) GHZ, etc.).

In the following specification. MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto. As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

Here, multi-link may include multi-band. That is, multi-link can represent links of several bands and multiple multi-links within one band at the same time.

FIG. 12 shows an example of a structure of a STA MLD.

FIG. 12 shows an example in which one STA MLD has three links. In 802.11be, for multi-link setup (that is, to simultaneously associate (setup) multiple links through Association frame exchange in one link), one STA in the STA MLD must provide information on one or more links in addition to its own link. In order to provide this information, the Multi-Link element was defined, and the basic structure of the Multi-Link element is shown in FIG. 13.

Figure 13:
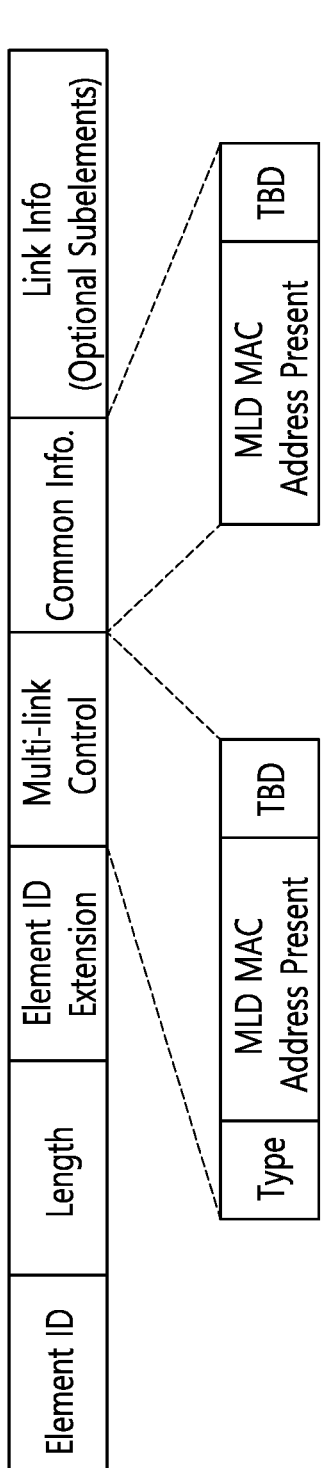
FIG. 13 illustrates structures of a Multi-link Control field and a Common Info field of a Multi-link Element.

The order, name, and size of the fields shown in FIG. 13 may change and may exist as additional fields. Basically, Common info means common information between STAs in the MLD, and specific information on each STA is indicated in the Per-STA Profile.

FIG. 13 illustrates structures of a Multi-link Control field and a Common Info field of a Multi-link Element.

The upper side of FIG. 13 represents a Multi-Link element, and the Multi-Link element includes Element ID, Length, Element ID Extension, Multi-Link Control, Common Info, and Link Info fields.

Referring to FIG. 13, the Multi-link Control field includes a Type subfield and an MLD MAC Address Present subfield. The Type subfield is used to distinguish variants of the Multi-Link element. Various variants of the Multi-Link element are used for various multi-link operations. The format of each variant of the Multi-Link element is as follows.

TABLE 1

| Type subfield value | Multi-Link element variant name |
| --- | --- |
| 0 | Basic Multi-Link element |
| 1 | Probe Request Multi-Link element |
| 2 | (ML) Reconfiguration Multi-Link element |
| 3 | TDLS(Tunneled Direct Link Setup) Multi-Link element |
| 4 | Priority Access Multi-Link element |
| 5-7 | Reserved |

Referring to Table 1 above, the type of ML IE is defined through the Type subfield of the Multi-Link Control field of ML IE. When the value of the Type subfield is 0, the ML IE indicates Basic variant Multi-Link element, when the value of the Type subfield is 1, the ML IE indicates Probe Request variant Multi-Link element, and when the value of the Type subfield is 2, the ML IE indicates ML Reconfiguration variant Multi-Link element.

Referring to FIG. 13, the Common Info field refers to common information between STAs in the MLD, and specific information for each STA is indicated in the Per-STA Profile in the Link Info field.

The Common Info field includes the MLD MAC Address subfield. If the MLD MAC Address Present subfield is set to 1 (or 0), the MAC addresses of STAs in the MLD may be included in the MLD MAC Address subfield.

Figure 14:
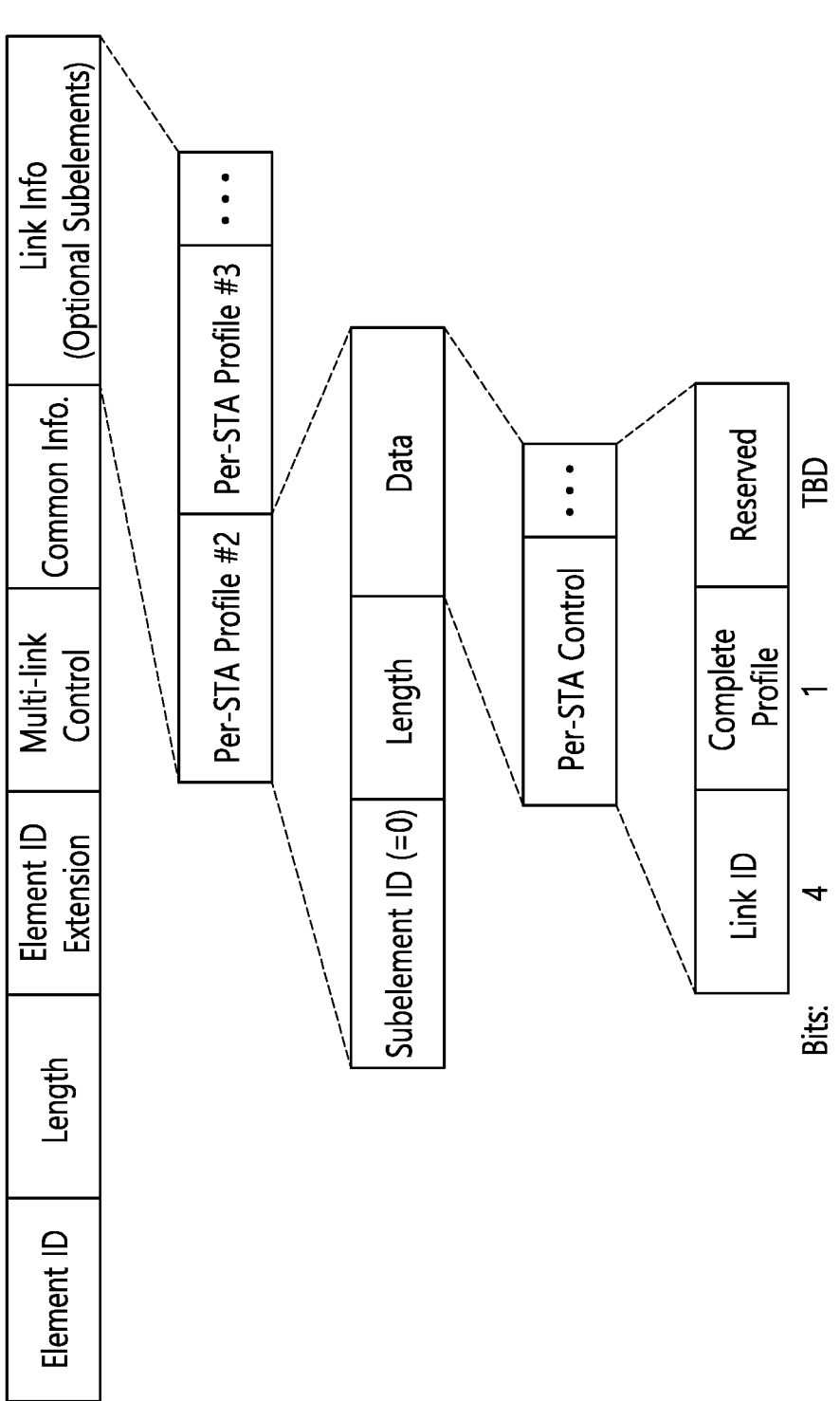
FIG. 14 shows the structure of the Link Info field of Multi-link Element.

FIG. 14 shows the structure of the Link Info field of Multi-link Element.

Referring to FIG. 14, the Link Info field includes a Per-STA Profile subfield when the Optional subelement ID is 0, and a Vendor Specific subfield when the Optional subelement ID is 221. Optional subelement IDs for multi-link elements are defined as follows.

TABLE 2

| Subelement ID | Name | Extensible |
| --- | --- | --- |
| 0 | Per-STA Profile | Yes |
| 1-220 | Reserved | |
| 221 | Vendor Specific | Vendor defined |
| 222-255 | Reserved | |

The Link Info field includes a Per-STA Profile subfield for other STAs (STAs operating on the non-association link) within the same MLD. Referring to FIG. 14, assuming that STA MLD includes STA 2 and STA 3, the Link Info field may include a Per-STA Profile #2 subfield for STA 2 and a Per-STA Profile #3 subfield for STA 3.

The Probe Request variant Multi-Link element (when the value of the Type subfield is 1) is a Multi-Link element structure used when requesting information from the AP about other APs of the same AP MLD as the AP MLD that includes the AP. The Probe Request frame including ML IE is called ML probe request.

Currently, in 802.11be, when frame types (e.g. (re)Association Request frame, (re)Association Probe Response frame, Probe Response frame, etc.) other than ML probe request include ML IE, Multi-link Element including Basic variant Multi-Link element is defined.

When an AP sends a message containing information about other APs, and the information about other APs is a transmitted BSSID (Basic Service Set IDentifier) set, this information can be delivered to the non-AP STA through a Beacon or Probe Response frame as a Multi-Link element (i.e. Basic variant Multi-Link element).

When the information of other APs transmitted through the message corresponds to a nontransmitted BSSID, this information can be delivered to the non-AP STA through a Beacon or Probe Response frame to the Multi-Link element (i.e. Basic variant Multi-Link element) included in the nontransmitted BSSID profile of the Multiple BSSID element.

In this specification, when a non-AP STA requests partial information about other APs, the case where the requested other AP is not only the transmitted BSSID set but also the nontransmitted BSSID set is considered, this specification also propose a method for signaling this request message and a method for the AP that receives it to respond.

Figure 15:
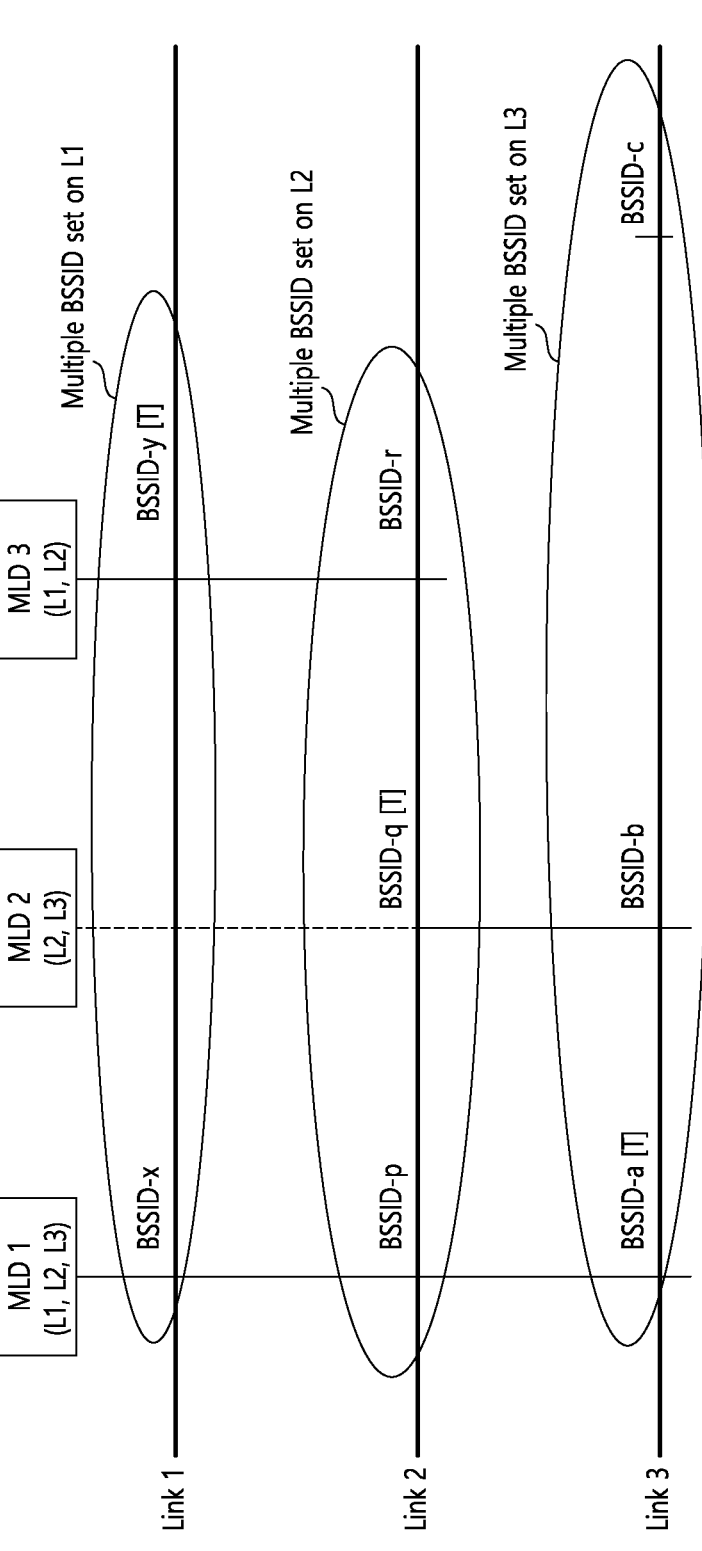
FIG. 15 shows an example of multiple BSSID sets on all links in a Multi-Link configuration.

FIG. 15 shows an example of multiple BSSID sets on all links in a Multi-Link configuration.

A method for distinguishing multiple BSSID set, transmitted BSSID set, and nontransmitted BSSID set can be explained through FIG. 15.

Referring to FIG. 15. APs belonging to the same multiple BSSID set configured for a link (or channel) do not belong to the same AP MLD.

FIG. 15 shows an example where an AP connected to the AP MLD belongs to the multiple BSSID set of the corresponding channel. Additionally. APs within the same AP MLD may correspond to transmitted BSSID or nontransmitted BSSID.

FIG. 15 shows that APs corresponding to BSSID-x and BSSID-y belonging to the same multiple BSSID set configured in Link1 are connected to different AP MLDs (MLD 1 and MLD 3). In Link1. AP-y connected to MLD 3 corresponds to the transmitted BSSID (indicated as BSSID-y) for the multiple BSSID set for Link1.

In Link2, there are three APs belonging to the same multiple BSSID set, and each AP is connected to a different AP MLD. AP-q connected to MLD2 corresponds to the transmitted BSSID (displayed as BSSID-q) for the multiple BSSID set set in Link2.

In Link3, there are three APs belonging to the same multiple BSSID set, and two of these APs are connected to two different MLDs. AP-a connected to MLD1 corresponds to the transmitted BSSID (displayed as BSSID-a) for the multiple BSSID set set in Link3. AP-c is not connected to any AP MLD. Each AP MLD independently assigns a link ID to the connected AP.

Referring to FIG. 15, the multiple BSSID set for Link 1 includes BSSID-x and BSSID-y. The multiple BSSID set for Link2 includes BSSID-p, BSSID-q, and BSSID-r. The multiple BSSID set for Link3 includes BSSID-a, BSSID-b, and BSSID-c.

For example, if BSSID-p is a transmitted BSSID, the remaining BSSID-q and BSSID-r of the same multiple BSSID set become nontransmitted BSSIDs. Even if an AP with a nontransmitted BSSID receives an ML probe request, it cannot directly transmit an ML probe response. The AP of the transmitted BSSID of the same multiple BSSID set can transmit an ML probe response instead. For example, even if an AP in BSSID-q receives an ML probe request, the AP in BSSID-q cannot directly transmit an ML probe response, and the AP in BSSID-p can transmit an ML probe response instead.

802.11be allows non-AP STAs to request partial information about other APs using ML probe requests. At this time, the non-AP STA's partial information request for other APs can be broadly divided into two types. The first is a method for requesting specific elements information from other APs. The second method is a method for requesting updated element information through critical update. Signaling for the first method is covered in Section 1, described later, and signaling for the second method is covered in Section 2.

1. A method for requesting, by a non-AP STA, specific IEs information from the AP corresponding to the nontransmitted BSSID set through an ML probe request.

802.11be defines a method in which a non-AP STA requests only some necessary information rather than all information of other APs through an ML probe request.

For this purpose, partial information of the Probe Request variant Multi-Link element of the ML probe request is transmitted by including an (Extended) Request element in the Per-STA Profile subelement corresponding to the requesting AP. At this time, the specific information requested can be indicated through the element ID information indicated in the Requested Element IDs field of the (Extended) Request element.

Figure 16:
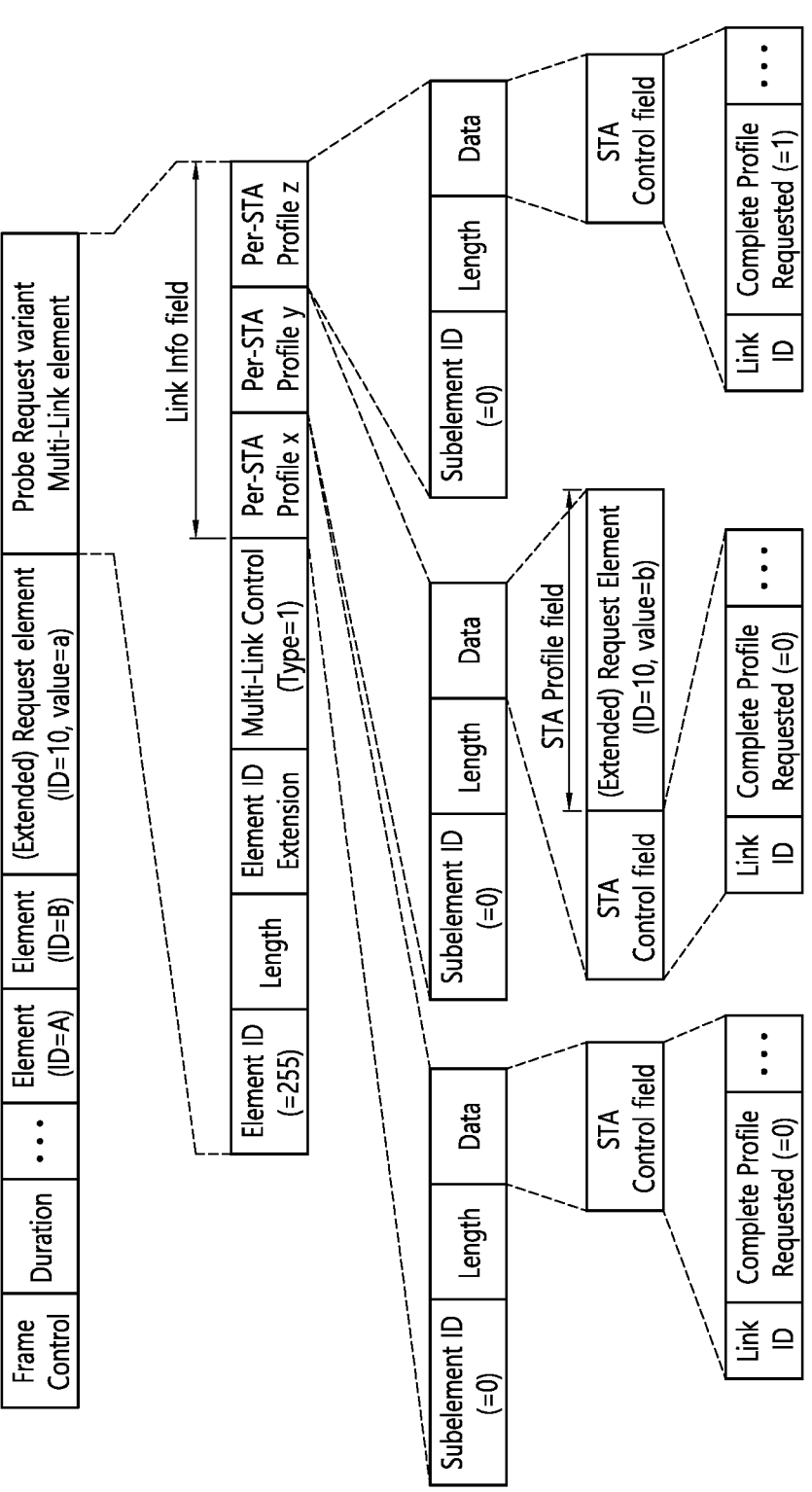
FIG. 16 shows an example of an ML probe request format for requesting partial information on other APs.

An example of the ML probe request format for this is shown in FIG. 16.

FIG. 16 shows an example of an ML probe request format for requesting partial information on other APs.

Referring to FIG. 16, when a non-AP STA requests partial information about AP (y), it is transmitted including an (Extended) Request element indicating the information to be requested in the Per-STA Profile (y), In this case, since it corresponds to a partial profile request rather than a complete profile, the value of the Complete Profile Requested field is also set to 0 and sent.

In this way, a non-AP STA can request information about not only the AP to which it is connected but also other APs through the Link ID subfield of the STA Control field of the Per-STA Profile subelement of the Multi-Link element (i.e., Probe request variant Multi-Link element)

At this time, the AP that received the ML probe request to request partial information about other APs responds with an ML probe response including the elements value requested by the non-AP STA. At this time, the requested information is transmitted within the Per-STA profile subelement corresponding to the requested AP of the Basic variant Multi-Link element included in the ML probe response.

In this specification, the non-AP STA extends the range of other APs requesting partial information to the nontransmitted BSSID set. However, in this specification, the AP corresponding to the nontransmitted BSSID set is defined based on the reporting AP that transmits the ML probe response, and refers to the APs corresponding to the nontransmitted BSSID of the multiple BSSID set based on the reporting AP.

Even when a non-AP STA requests information about APs belonging to the nontransmitted BSSID set, the ML probe request format in which the non-AP STA requests information is the same. Information on the Probe Request variant Multi-Link element included in the ML probe request is transmitted by including an (Extended) Request element in the Per-STA Profile subelement corresponding to the requesting AP. At this time, the AP corresponding to the nontransmitted BSSID set is indicated in the Link ID subfield of the STA Control field of the Per-STA Profile subelement.

However, at this time, the ML probe response format containing information about the requested APs is different from the existing one. Information on APs corresponding to the Nontransmitted BSSID set must be transmitted including the Basic variant Multi-Link element in the Nontransmitted BSSID profile of the Multiple BSSID element of the ML probe response. The Basic variant Multi-Link element includes the requested element information in the Per-STA profile subelement corresponding to the requested AP, as above.

Figure 17:
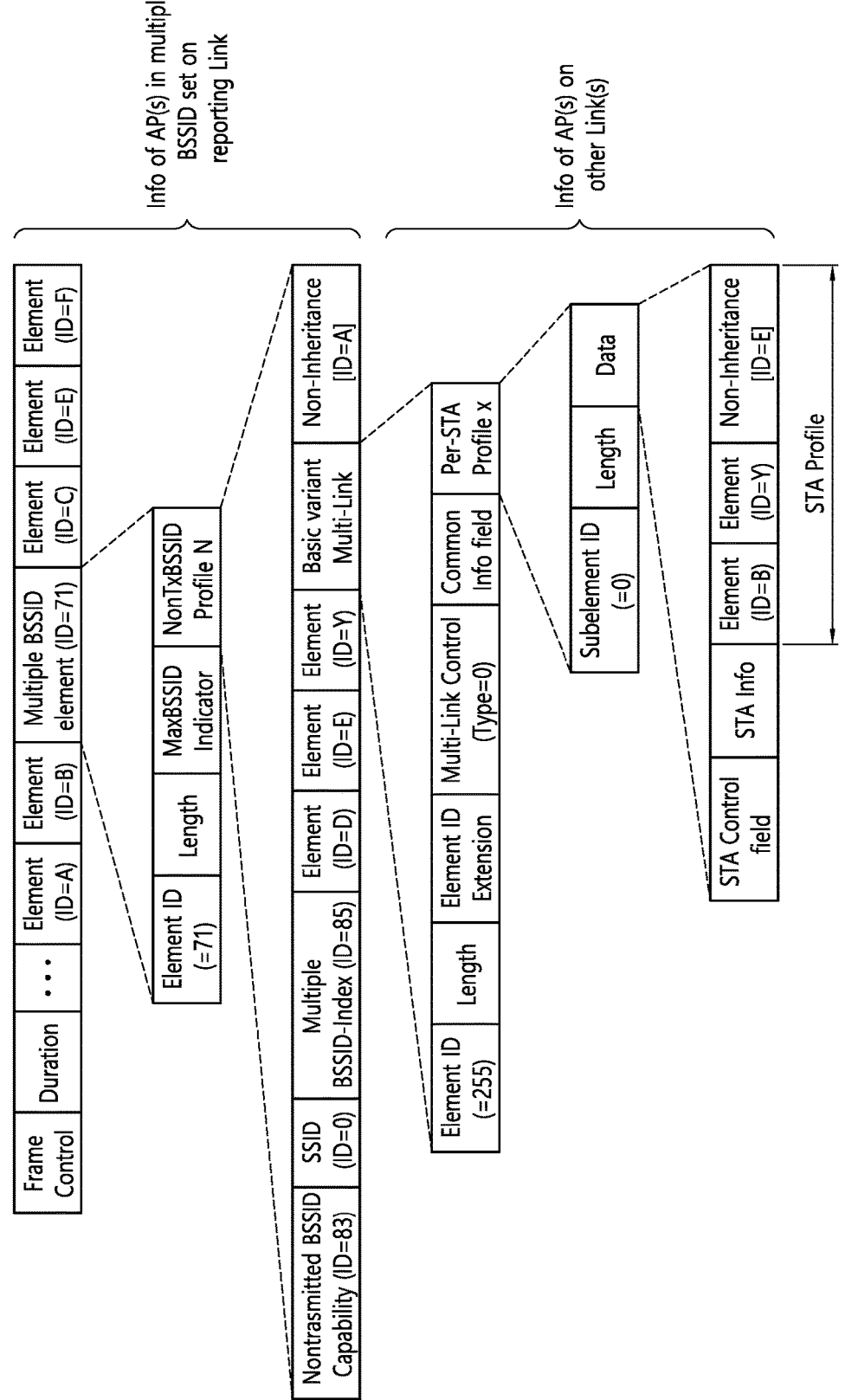
FIG. 17 shows an example of the ML probe response frame format when requesting partial information on an AP corresponding to a nontransmitted BSSID set.

An example of the ML probe response format for this is shown in FIG. 17.

FIG. 17 shows an example of the ML probe response frame format when requesting partial information on an AP corresponding to a nontransmitted BSSID set.

Referring to FIG. 17, when a non-AP STA requests partial information of AP (x) corresponding to the nontransmitted BSSID set through an ML probe request (for example, in the per-STA profile (x) of the ML probe request) (including the Extended) Request element), the AP that received this is the requested part of the Per-STA profile (x) corresponding to the requested AP in the Basic variant Multi-Link element of the NonTxBSSID profile subelement of the Multiple BSSID element of the ML probe response. The response includes information elements (i.e., elements indicated by the (Extended) Request element included in the Per-STA profile of the ML probe request).

2. A method for requesting, by a non-AP STA, updated BSS parameters information from the AP corresponding to the nontransmitted BSSID set through an ML probe request.

In this section, even when a non-AP STA requests partial information about updated parameters through critical update, the scope of other APs is extended to the nontransmitted BSSID set. However, in this section, the AP corresponding to the nontransmitted BSSID set is defined based on the reporting AP that transmits the ML probe response, and refers to APs corresponding to the nontransmitted BSSID of the multiple BSSID set based on the reporting AP.

Even when a non-AP STA requests information on APs belonging to the nontransmitted BSSID set, the ML probe request format in which the non-AP STA requests partial information related to critical update is the same. Partial information of the Probe Request variant Multi-Link element of the ML probe request is transmitted by including the STA's BPCC (Basic Service Set (BSS) Parameters Change Count) subfield value in the Per-STA Profile subelement corresponding to the requesting AP. At this time, the BSS Parameters Change Count subfield value included in the Per-STA Profile means the most recently received and stored value from the AP requesting information (i.e., the AP corresponding to the per-STA profile) through a Beacon frame or Probe Response frame, etc.

At this time, the AP that received the ML probe request to request partial information related to the critical update for other APs responds with an ML probe response including the elements value requested by the non-AP STA. At this time, the requested information is transmitted within the Per-STA profile subelement corresponding to the requested AP of the Basic variant Multi-Link element included in the ML probe response. At this time, the elements included in the per-STA profile correspond only to updated BSS parameters corresponding to the value gap by comparing the current BSS Parameters Change Count value of the AP with the BSS Parameters Change Count value of the per-STA profile sent by a non-AP STA through an ML probe request. Or, the elements included in the per-STA profile may correspond to all elements classified as critical update events or complete profile information. At this time, the AP corresponding to the nontransmitted BSSID set is indicated in the Link ID subfield of the STA Control field of the Per-STA Profile subelement.

However, at this time, the ML probe response format containing information about the requested APs is different from the existing one. Information on APs corresponding to the Nontransmitted BSSID set must be transmitted including the Basic variant Multi-Link element in the Nontransmitted BSSID profile of the Multiple BSSID element of the ML probe response. The Basic variant Multi-Link element includes the requested element information in the Per-STA profile subelement corresponding to the requested AP, as above.

An example of the ML probe response format for this is shown in FIG. 17.

Referring to FIG. 17, when a non-AP STA requests changed information through a critical update of AP (x) corresponding to the nontransmitted BSSID set through an ML probe request (e.g., per-STA profile of the ML probe request) (include the BSS Parameters Change Count subfield in (x)), the AP that received this includes the Basic variant Multi-Link element of the NonTxBSSID profile subelement of the Multiple BSSID element of the ML probe response, and responds it by including the requested partial information elements in the Per-STA profile (x) corresponding to the requested AP in the Basic variant Multi-Link element.

Through the method proposed in this specification, a non-AP STA can request partial information not only for other APs belonging to the transmitted BSSID for the AP to which it is connected, but also for other APs belonging to the nontransmitted BSSID set. The method of requesting partial information can be useful because it can reduce frame overhead compared to the method of requesting full information. If this range is expanded to APs belonging to the nontransmitted BSSID set. STA can perform ML probing for more ranges. In particular, in the case of the current 802.11be, it is defined to transmit not only information about APs belonging to the transmitted BSSID through a Beacon or Probe Response frame, but also some information about APs corresponding to the nontransmitted BSSID set through the Reduced Neighbor Report (RNR) element of the frame. Because it has been done, this method may be more useful. For example, by receiving the BSS Parameters Change Count subfield of the MLD Parameters field of the RNR element of the Beacon frame, partial information can be requested by checking whether the AP corresponding to the nontransmitted BSSID set has a critical update. Also, if the non-AP STA only know the Link ID of the AP corresponding to the nontransmitted BSSID set, through the proposal of this embodiment, information about APs corresponding to the nontransmitted BSSID set can be obtained through a partial information request rather than a complete information request.

The ML probe response format of FIG. 17 is explained based on an example of the multiple BSSID set of FIG. 15 as follows.

It is assumed that the Multiple BSSID element (ID=71) in FIG. 17 corresponds to the Multiple BSSID set on L2 (Link2) in FIG. 15. According to this. NonTxBSSID Profile N of FIG. 17 may correspond to the profile element for BSSID-q.

The Per-STA Profile x of the Basic variant Multi-Link in FIG. 17 may correspond to the profile element for the AP (other AP) of BSSID-b in FIG. 15. At this time, the above-described reporting AP (first transmitting STA) can be referred to as BSSID-p, and APs corresponding to the nontransmitted BSSID can be referred to as BSSID-q (and/or BSSID-r). This is because if BSSID-p is a transmitted BSSID, the remaining BSSID-q and BSSID-r of the same multiple BSSID set become nontransmitted BSSIDs. At this time, the other AP (second transmitting STA) can be said to be an AP corresponding to BSSID-b (since it is an AP for Link 3, which is a link other than Link 2).

| | All elements classified as the critical update event.<br>The classified elements (or fields) are as follows |
| --- | --- |
| A. | Channel Switch Announcement |
| B. | Extended Channel Switch Announcement element |
| C. | EDCA parameters element |
| D. | Quiet element |
| E. | DSSS Parameter Set |
| F. | CF Parameter Set element |
| G. | HT Operation element |
| H. | Wide Bandwidth Channel Switch element |
| I. | Channel Switch Wrapper element |
| J. | Operating Mode Notification element |
| K. | Quiet Channel element |
| L. | VHT Operation element |
| M. | HE Operation element |
| N. | Broadcast TWT element |
| O. | BSS Color Change Announcement element |
| P. | MU EDCA Parameter Set element |
| Q. | Spatial Reuse Parameter Set element |
| R. | UORA Parameter Set element |
| S. | EHT Operation element |
| T. | Basic variant Multi-Link element |

(NOTE: Refer to 11.2.3.15 TIM Broadcast of the IEEE 802.11 standard).

For reference, elements classified as the Critical update event mentioned above may have other elements or fields added in the future depending on the standard version.

Hereinafter, the above-described embodiment will be described with reference to FIG. 1 to FIG. 17.

Figure 18:
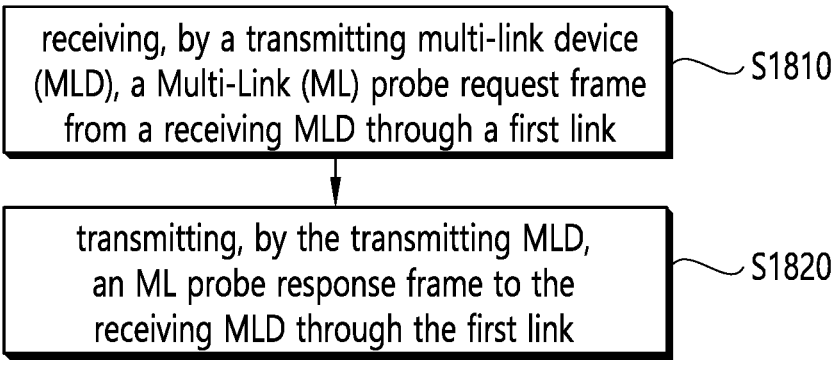
FIG. 18 is a flowchart showing a procedure in which a transmitting MLD responds information on another AP corresponding to a nontransmitted BSSID set according to this embodiment.

FIG. 18 is a flowchart showing a procedure in which a transmitting MLD responds information on another AP corresponding to a nontransmitted BSSID set according to this embodiment.

The example of FIG. 18 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The present embodiment proposes a method and apparatus in which a non-AP STA requests information on another AP corresponding to a nontransmitted BSSID set through an ML probe request frame and receives the requested information through an ML probe response frame. Here, the first transmitting STA operating on the first link included in the first transmitting MLD may correspond to a reporting AP. A second transmitting STA operating on the first link included in the second transmitting MLD and a fourth transmitting STA operating on the first link included in the third transmitting MLD may correspond to an AP corresponding to the nontransmitted BSSID of a multiple BSSID set based on the reporting AP. A third transmitting STA operating on the second link included in the second transmitting MLD may correspond to another AP whose range of the other AP with a different link is extended to the nontransmitted BSSID.

In step S1810, a transmitting Multi-Link Device (MLD) receives a Multi-Link (ML) probe request frame from a receiving MLD through a first link.

In step S1820, the transmitting MLD transmits an ML probe response frame to the receiving MLD through the first link.

The transmitting MLD includes first and second transmitting MLD. The first transmitting MLD includes a first transmitting station (STA) operating on the first link. The second transmitting MLD includes a second transmitting STA operating on the first link and a third transmitting STA operating on the second link.

The second transmitting STA is a transmitting STA corresponding to a first nontransmitted BSSID of a multiple Basic Service Set IDentifier (BSSID) set based on the first transmitting STA. When the first transmitting STA is a transmitting STA corresponding to a transmitted BSSID of the multiple BSSID set, the second transmitting STA may be a transmitting STA corresponding to a nontransmitted BSSID of the multi-BSSID set.

Transmitting STAs (APs) belonging to the same multiple BSSID set configured for a specific link do not belong to the same transmitting MLD (AP MLD). This embodiment shows an example in which the first transmitting STA included in the first transmitting MLD and the second transmitting STA included in the second transmitting MLD belong to the multiple BSSID set set in the first link.

The receiving MLD includes a first receiving STA operating on the first link and a second receiving STA operating on the second link. The first receiving STA may operate on the first link with the first transmitting STA of the first transmitting MLD.

The ML probe response frame includes a multiple BSSID element. The multiple BSSID element may indicate the multiple BSSID set with a specific ID value. For example, when the specific ID value is 71, the multiple BSSID element may be set as an element or field for the multiple BSSID set including the first and second transmitting STAs (or the fourth transmitting STA described later) operating in the first link.

The multiple BSSID element includes a profile of the first nontransmitted BSSID. The profile of the first nontransmitted BSSID may be set as a profile field for the second transmitting STA corresponding to the first nontransmitted BSSID of the multiple BSSID set.

The profile of the first nontransmitted BSSID includes a basic ML element. The basic ML element includes a profile subelement of the third transmitting STA. That is, the profile of the first nontransmitted BSSID may include a profile subelement of another AP (the third transmitting STA) operating on a link other than the link on which the non-AP STA operates.

When the first receiving STA requests updated BSS parameter information for the third transmitting STA (or partial information or information on a specific element for the third transmitting STA), the profile subelement of the third transmitting STA includes the updated BSS parameter information for the third transmitting STA (or partial information or information on a specific element for the third transmitting STA).

That is, this embodiment may extend the range of the other AP (the third transmitting STA) operating on a link other than the link (the second link) on which the non-AP STA (the first receiving STA) operates to the nontransmitted BSSID set, by including the multiple BSSID element in the ML probe response frame, by including the profile of the first nontransmitted BSSID in the multiple BSSID element, and by including the profile subelement of the third transmitting STA in the profile of the first nontransmitted BSSID.

According to the method proposed in this embodiment, a non-AP STA can obtain information about APs corresponding to a nontransmitted BSSID through an ML probe request frame. In particular, the method of requesting partial information of other APs in AP MLD can be useful because it can reduce frame overhead compared to the method of requesting complete information. This method has the effect of expanding the range of these other APs to APs belonging to the nontransmitted BSSID set, allowing non-AP STAs to perform ML probing for a wider range of other APs.

The ML probe request frame may include a probe request ML element. The probe request ML element may include a profile subelement of the second receiving STA.

The profile subelement of the second receiving STA may include a first link Identifier (ID) subfield and a Basic Service Set (BSS) Parameters Change Count (BPCC) subfield.

The first link ID subfield may include link ID information of the third transmitting STA. The BPCC subfield may include a first BPCC value most recently received from the third transmitting STA through a beacon frame or a probe response frame.

When a most recently updated BPCC value of the second transmitting STA is referred to as a second BPCC value, the updated BSS parameter information for the third transmitting STA may include update information on elements classified based on a gap between the first BPCC value and the second BPCC value. For example, when the first BPCC value is 3 and the second BPCC value is 4, it can be seen that information (or elements) related to an important update event of the third transmitting STA must be transmitted to the first receiving STA by a difference of 1.

Information related to the critical update event includes Channel Switch Announcement, Extended Channel Switch Announcement element, EDCA parameters element, Quiet element, DSSS Parameter Set, CF Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, UORA Parameter Set element, EHT Operation element and/or Basic May include variant Multi-Link elements. The update information for elements classified based on the gap between BPCC values may include at least one piece of information related to the critical update event according to the gap between the BPCC values.

The profile subelement of the second receiving STA may further include a Complete Profile Requested subfield.

When the updated BSS parameter information for the third transmitting STA is partial information, a value of the Complete Profile Requested subfield may be set to 0. When the updated BSS parameter information for the third transmitting STA is complete information, a value of the Complete Profile Requested subfield may be set to 1.

The transmitting MLD may further include a third transmitting MLD. The third transmitting MLD may include a fourth transmitting STA operating on the first link.

The fourth transmitting STA may be a transmitting STA corresponding to a second nontransmitted BSSID of the multiple BSSID set based on the first transmitting STA. The first transmitting STA may be a transmitting STA corresponding to a transmitted BSSID of the multiple BSSID set. Accordingly, the fourth transmitting STA may be a transmitting STA corresponding to a nontransmitted BSSID of the multiple BSSID set.

When the first receiving STA requests updated BSS parameter information for the second or fourth transmitting STA, the first receiving STA may receive the ML probe response frame from the first transmitting STA rather than the second or fourth transmitting STA. Since the second or fourth transmitting STA is a transmitting STA corresponding to the nontransmitted BSSID, it cannot directly transmit the ML probe response frame.

The ML probe response frame may include the updated BSS parameter information for the second or fourth transmitting STA. Since the second or fourth transmitting STA operates on the first link, the updated BSS parameter information for the second or fourth transmitting STA may be transmitted not included in the basic ML element but included in the profile of the first or second nontransmitted BSSID.

Figure 19:
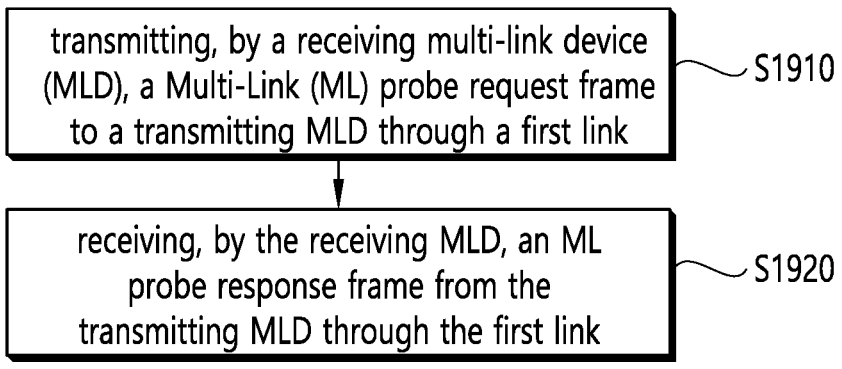
FIG. 19 is a flowchart showing a procedure in which a receiving MLD requests information on another AP corresponding to a nontransmitted BSSID set according to this embodiment.

FIG. 19 is a flowchart showing a procedure in which a receiving MLD requests information on another AP corresponding to a nontransmitted BSSID set according to this embodiment.

The example of FIG. 19 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The present embodiment proposes a method and apparatus in which a non-AP STA requests information on another AP corresponding to a nontransmitted BSSID set through an ML probe request frame and receives the requested information through an ML probe response frame. Here, the first transmitting STA operating on the first link included in the first transmitting MLD may correspond to a reporting AP. A second transmitting STA operating on the first link included in the second transmitting MLD and a fourth transmitting STA operating on the first link included in the third transmitting MLD may correspond to an AP corresponding to the nontransmitted BSSID of a multiple BSSID set based on the reporting AP. A third transmitting STA operating on the second link included in the second transmitting MLD may correspond to another AP whose range of the other AP with a different link is extended to the nontransmitted BSSID.

In step S1910, a receiving Multi-link Device (MLD) transmits a Multi-Link (ML) probe request frame to a transmitting MLD through a first link.

In step S1920, the receiving MLD receives an ML probe response frame from the transmitting MLD through the first link.

The transmitting MLD includes first and second transmitting MLD. The first transmitting MLD includes a first transmitting station (STA) operating on the first link. The second transmitting MLD includes a second transmitting STA operating on the first link and a third transmitting STA operating on the second link.

The second transmitting STA is a transmitting STA corresponding to a first nontransmitted BSSID of a multiple Basic Service Set IDentifier (BSSID) set based on the first transmitting STA. When the first transmitting STA is a transmitting STA corresponding to a transmitted BSSID of the multiple BSSID set, the second transmitting STA may be a transmitting STA corresponding to a nontransmitted BSSID of the multi-BSSID set.

Transmitting STAs (APs) belonging to the same multiple BSSID set configured for a specific link do not belong to the same transmitting MLD (AP MLD). This embodiment shows an example in which the first transmitting STA included in the first transmitting MLD and the second transmitting STA included in the second transmitting MLD belong to the multiple BSSID set set in the first link.

The receiving MLD includes a first receiving STA operating on the first link and a second receiving STA operating on the second link. The first receiving STA may operate on the first link with the first transmitting STA of the first transmitting MLD.

The ML probe response frame includes a multiple BSSID element. The multiple BSSID element may indicate the multiple BSSID set with a specific ID value. For example, when the specific ID value is 71, the multiple BSSID element may be set as an element or field for the multiple BSSID set including the first and second transmitting STAs (or the fourth transmitting STA described later) operating in the first link.

The multiple BSSID element includes a profile of the first nontransmitted BSSID. The profile of the first nontransmitted BSSID may be set as a profile field for the second transmitting STA corresponding to the first nontransmitted BSSID of the multiple BSSID set.

The profile of the first nontransmitted BSSID includes a basic ML element. The basic ML element includes a profile subelement of the third transmitting STA. That is, the profile of the first nontransmitted BSSID may include a profile subelement of another AP (the third transmitting STA) operating on a link other than the link on which the non-AP STA operates.

When the first receiving STA requests updated BSS parameter information for the third transmitting STA (or partial information or information on a specific element for the third transmitting STA), the profile subelement of the third transmitting STA includes the updated BSS parameter information for the third transmitting STA (or partial information or information on a specific element for the third transmitting STA).

That is, this embodiment may extend the range of the other AP (the third transmitting STA) operating on a link other than the link (the second link) on which the non-AP STA (the first receiving STA) operates to the nontransmitted BSSID set, by including the multiple BSSID element in the ML probe response frame, by including the profile of the first nontransmitted BSSID in the multiple BSSID element, and by including the profile subelement of the third transmitting STA in the profile of the first nontransmitted BSSID.

According to the method proposed in this embodiment, a non-AP STA can obtain information about APs corresponding to a nontransmitted BSSID through an ML probe request frame. In particular, the method of requesting partial information of other APs in AP MLD can be useful because it can reduce frame overhead compared to the method of requesting complete information. This method has the effect of expanding the range of these other APs to APs belonging to the nontransmitted BSSID set, allowing non-AP STAs to perform ML probing for a wider range of other APs.

The ML probe request frame may include a probe request ML element. The probe request ML element may include a profile subelement of the second receiving STA.

The profile subelement of the second receiving STA may include a first link Identifier (ID) subfield and a Basic Service Set (BSS) Parameters Change Count (BPCC) subfield.

The first link ID subfield may include link ID information of the third transmitting STA. The BPCC subfield may include a first BPCC value most recently received from the third transmitting STA through a beacon frame or a probe response frame.

When a most recently updated BPCC value of the second transmitting STA is referred to as a second BPCC value, the updated BSS parameter information for the third transmitting STA may include update information on elements classified based on a gap between the first BPCC value and the second BPCC value. For example, when the first BPCC value is 3 and the second BPCC value is 4, it can be seen that information (or elements) related to an important update event of the third transmitting STA must be transmitted to the first receiving STA by a difference of 1.

Information related to the critical update event includes Channel Switch Announcement, Extended Channel Switch Announcement element, EDCA parameters element, Quiet element, DSSS Parameter Set, CF Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, UORA Parameter Set element, EHT Operation element and/or Basic May include variant Multi-Link elements. The update information for elements classified based on the gap between BPCC values may include at least one piece of information related to the critical update event according to the gap between the BPCC values.

The profile subelement of the second receiving STA may further include a Complete Profile Requested subfield.

When the updated BSS parameter information for the third transmitting STA is partial information, a value of the Complete Profile Requested subfield may be set to 0). When the updated BSS parameter information for the third transmitting STA is complete information, a value of the Complete Profile Requested subfield may be set to 1.

The transmitting MLD may further include a third transmitting MLD. The third transmitting MLD may include a fourth transmitting STA operating on the first link.

The fourth transmitting STA may be a transmitting STA corresponding to a second nontransmitted BSSID of the multiple BSSID set based on the first transmitting STA. The first transmitting STA may be a transmitting STA corresponding to a transmitted BSSID of the multiple BSSID set. Accordingly, the fourth transmitting STA may be a transmitting STA corresponding to a nontransmitted BSSID of the multiple BSSID set.

When the first receiving STA requests updated BSS parameter information for the second or fourth transmitting STA, the first receiving STA may receive the ML probe response frame from the first transmitting STA rather than the second or fourth transmitting STA. Since the second or fourth transmitting STA is a transmitting STA corresponding to the nontransmitted BSSID, it cannot directly transmit the ML probe response frame.

The ML probe response frame may include the updated BSS parameter information for the second or fourth transmitting STA. Since the second or fourth transmitting STA operates on the first link, the updated BSS parameter information for the second or fourth transmitting STA may be transmitted not included in the basic ML element but included in the profile of the first or second nontransmitted BSSID.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure transmits a Multi-Link (ML) probe request frame to a transmitting multi-link device (MLD) through a first link; and receives an ML probe response frame from the transmitting MLD through the first link.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including transmitting a Multi-Link (ML) probe request frame to a transmitting multi-link device (MLD) through a first link; and receiving an ML probe response frame from the transmitting MLD through the first link. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a non-access point (non-AP) multi-link device (MLD) in a wireless local area network (WLAN) system, the method comprising:

transmitting, by a first non-AP station (STA) affiliated with the non-AP MLD, a Multi-Link (ML) probe request frame to a first AP affiliated with an AP MLD; and receiving, by the first non-AP STA, an ML probe response frame from the first AP, wherein the AP MLD includes a first AP MLD and a second AP MLD, wherein the first AP operating on a first link is affiliated with the first AP MLD, wherein a second AP operating on the first link and a third AP operating on a second link are affiliated with the second AP MLD, wherein the first AP is configured as an AP related to a transmitted Basic Service Set Identifier (BSSID) of a first multiple BSSID set, the second AP is configured as an AP related to a first nontransmitted BSSID of the first multiple BSSID set, and the third AP is configured as an AP related to a second nontransmitted BSSID of a second multiple BSSID set, wherein the first multiple BSSID set is configured for the first link, wherein the second multiple BSSID set is configured for the second link, wherein the first non-AP STA operating on the first link and a second non-AP STA operating on the second link are affiliated with the non-AP MLD, wherein the ML probe response frame includes a multiple BSSID element, wherein the multiple BSSID element includes a profile of the first nontransmitted BSSID, wherein the profile of the first nontransmitted BSSID includes a basic ML element, wherein the basic ML element includes a profile subelement of the third AP, wherein based on the first non-AP STA requesting updated BSS parameter information for the third AP, the profile subelement of the third AP includes the updated BSS parameter information for the third AP, wherein the ML probe request frame further includes a probe request ML element, wherein the probe request ML element includes a profile subelement of the second non-AP STA, wherein the profile subelement of the second non-AP STA includes a first link Identifier ID) subfield and a Basic Service Set (BSS) Parameters Change Count (BPCC) subfield, wherein the first link ID subfield includes link ID information of the third AP, and wherein the BPCC subfield includes a first BPCC value most recently received from the third AP through a beacon frame or a probe response frame.

2. The method of claim 1, wherein based on a most recently updated BPCC value of the second AP being referred to as a second BPCC value, the updated BSS parameter information for the third AP includes update information on elements classified based on a gap between the first BPCC value and the second BPCC value.

3. The method of claim 1, wherein the profile subelement of the second non-AP STA further includes a Complete Profile Requested subfield, wherein based on the updated BSS parameter information for the third AP being partial information, a value of the Complete Profile Requested subfield is set to 0, wherein based on the updated BSS parameter information for the third AP being complete information, a value of the Complete Profile Requested subfield is set to 1.

4. The method of claim 1, wherein the AP MLD further includes a third AP MLD, wherein the third AP MLD includes a fourth AP operating on the first link, wherein the fourth AP is configured as an AP related to a second nontransmitted BSSID of the first multiple BSSID set.

5. The method of claim 4, wherein based on the first non-AP STA requesting updated BSS parameter information for the second or fourth AP, the first non-AP STA receives the ML probe response frame from the first AP rather than the second or fourth AP, the ML probe response frame includes the updated BSS parameter information for the second or fourth AP.

6. A non-access point (non-AP) multi-link device (MLD) in a wireless local area network (WLAN) system, the non-AP MLD comprising:

a memory;

a transceiver; and a processor being operatively connected to the memory and the transceiver, wherein the processor is configured to:

transmit, by a first non-AP station (STA) affiliated with the non-AP MLD, a Multi-Link (ML) probe request frame to a first AP affiliated with an AP MLD; and receive, by the first non-AP STA, an ML probe response frame from the first AP, wherein the AP MLD includes a first AP MLD and a second AP MLD, wherein the first AP operating on a first link is affiliated with the first AP MLD, wherein a second AP operating on the first link and a third AP operating on a second link are affiliated with the second AP MLD, wherein the first AP is configured as an AP related to a transmitted Basic Service Set Identifier (BSSID) of a first multiple BSSID set, the second AP is configured as an AP related to a first nontransmitted BSSID of the first multiple BSSID set, and the third AP is configured as an AP related to a second nontransmitted BSSID of a second multiple BSSID set, wherein the first multiple BSSID set is configured for the first link, wherein the second multiple BSSID set is configured for the second link, wherein the first non-AP STA operating on the first link and a second non-AP STA operating on the second link are affiliated with the non-AP MLD, wherein the ML probe response frame includes a multiple BSSID element, wherein the multiple BSSID element includes a profile of the first nontransmitted BSSID, wherein the profile of the first nontransmitted BSSID includes a basic ML element, wherein the basic ML element includes a profile subelement of the third AP, wherein based on the first non-AP STA requesting updated BSS parameter information for the third AP, the profile subelement of the third AP includes the updated BSS parameter information for the third AP, wherein the ML probe request frame further includes a probe request ML element, wherein the probe request ML element includes a profile subelement of the second non-AP STA, wherein the profile subelement of the second non-AP STA includes a first link Identifier (ID) subfield and a Basic Service Set (BSS) Parameters Change Count (BPCC) subfield, wherein the first link ID subfield includes link ID information of the third AP, and wherein the BPCC subfield includes a first BPCC value most recently received from the third AP through a beacon frame or a probe response frame.

7. A method performed by an access point (AP) multi-link device (MLD) in a wireless local area network (WLAN) system, the method comprising:

receiving, by a first AP affiliated with the AP MLD, a Multi-Link (ML) probe request frame from a first non-AP station (STA) affiliated with a non-AP MLD; and transmitting, by the first AP, an ML probe response frame to the first non-AP STA, wherein the AP MLD includes a first AP MLD and a second AP MLD, wherein the first AP operating on a first link is affiliated with the first AP MLD, wherein a second AP operating on the first link and a third AP operating on a second link are affiliated with the second AP MLD, wherein the first AP is configured as an AP related to a transmitted Basic Service Set Identifier (BSSID) of a first multiple BSSID set, the second AP is configured as an AP related to a first nontransmitted BSSID of the first multiple BSSID set, and the third AP is configured as an AP related to a second nontransmitted BSSID of a second multiple BSSID set, wherein the first multiple BSSID set is configured for the first link, wherein the second multiple BSSID set is configured for the second link, wherein the first non-AP STA operating on the first link and a second non-AP STA operating on the second link are affiliated with the non-AP MLD, wherein the ML probe response frame includes a multiple BSSID element, wherein the multiple BSSID element includes a profile of the first nontransmitted BSSID, wherein the profile of the first nontransmitted BSSID includes a basic ML element, wherein the basic ML element includes a profile subelement of the third AP, wherein based on the first non-AP STA requesting updated BSS parameter information for the third AP, the profile subelement of the third AP includes the updated BSS parameter information for the third AP, wherein the ML probe request frame further includes a probe request ML element, wherein the probe request ML element includes a profile subelement of the second non-AP STA, wherein the profile subelement of the second non-AP STA includes a first link Identifier (ID) subfield and a Basic Service Set (BSS) Parameters Change Count (BPCC) subfield, wherein the first link ID subfield includes link ID information of the third AP, and wherein the BPCC subfield includes a first BPCC value most recently received from the third AP through a beacon frame or a probe response frame.

8. The method of claim 7, wherein based on a most recently updated BPCC value of the second AP being referred to as a second BPCC value, the updated BSS parameter information for the third AP includes update information on elements classified based on a gap between the first BPCC value and the second BPCC value.

9. The method of claim 7, wherein the profile subelement of the second non-AP STA further includes a Complete Profile Requested subfield, wherein based on the updated BSS parameter information for the third AP being partial information, a value of the Complete Profile Requested subfield is set to 0, wherein based on the updated BSS parameter information for the third AP being complete information, a value of the Complete Profile Requested subfield is set to 1.

10. The method of claim 7, wherein the AP MLD further includes a third AP MLD, wherein the third AP MLD includes a fourth AP operating on the first link, wherein the fourth AP is configured as an AP related to a second nontransmitted BSSID of the first multiple BSSID set.

11. The method of claim 10, wherein based on the first non-AP STA requesting updated BSS parameter information for the second or fourth AP, the first non-AP STA receives the ML probe response frame from the first AP rather than the second or fourth AP, the ML probe response frame includes the updated BSS parameter information for the second or fourth AP.

\* \* \* \* \*